Feb. 3, 1931.  F. T. KNIGHT  1,790,753
TRAIN CONTROL
Filed July 6, 1928   12 Sheets-Sheet 1
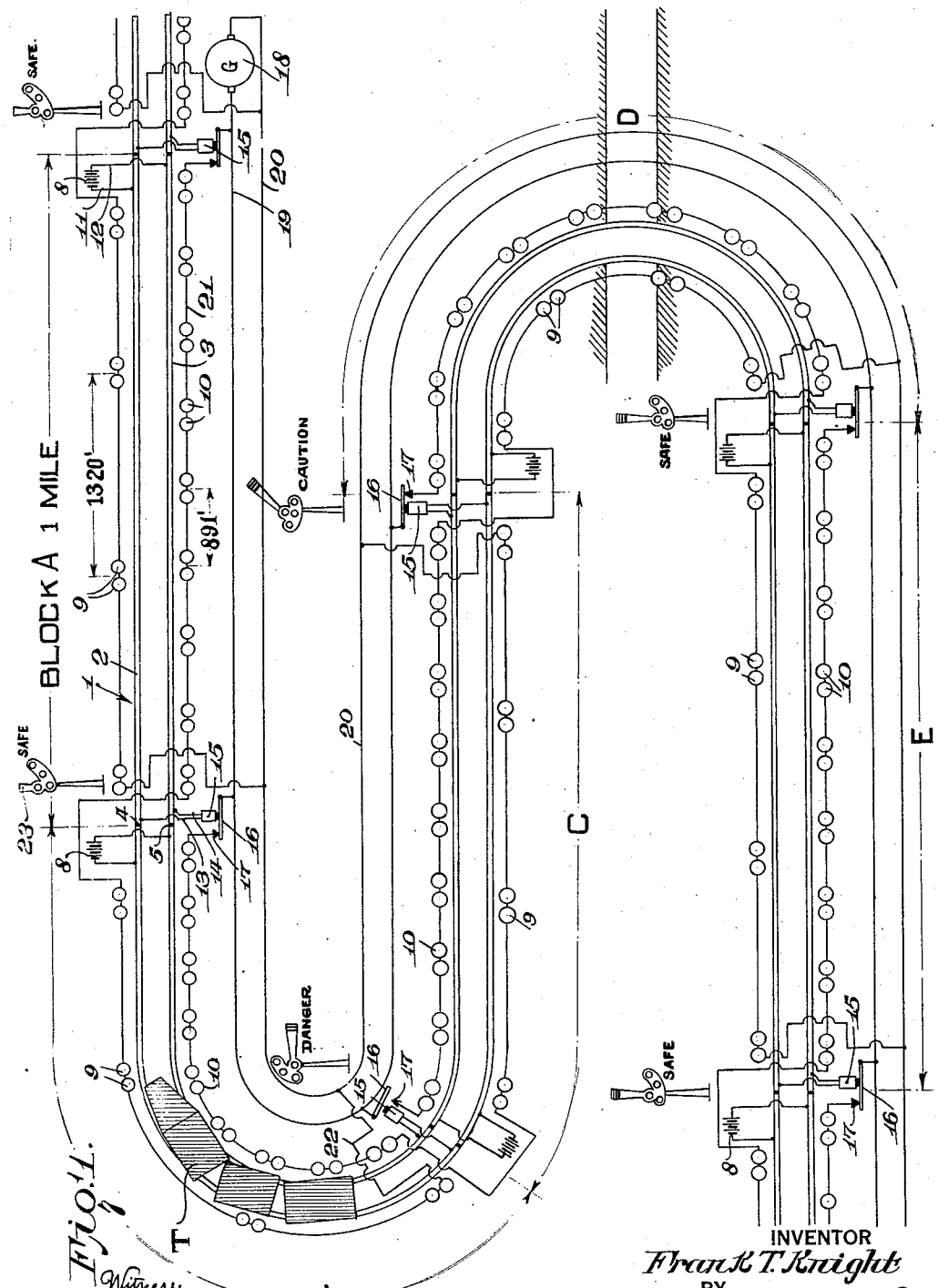
INVENTOR
Frank T. Knight
BY
ATTORNEY

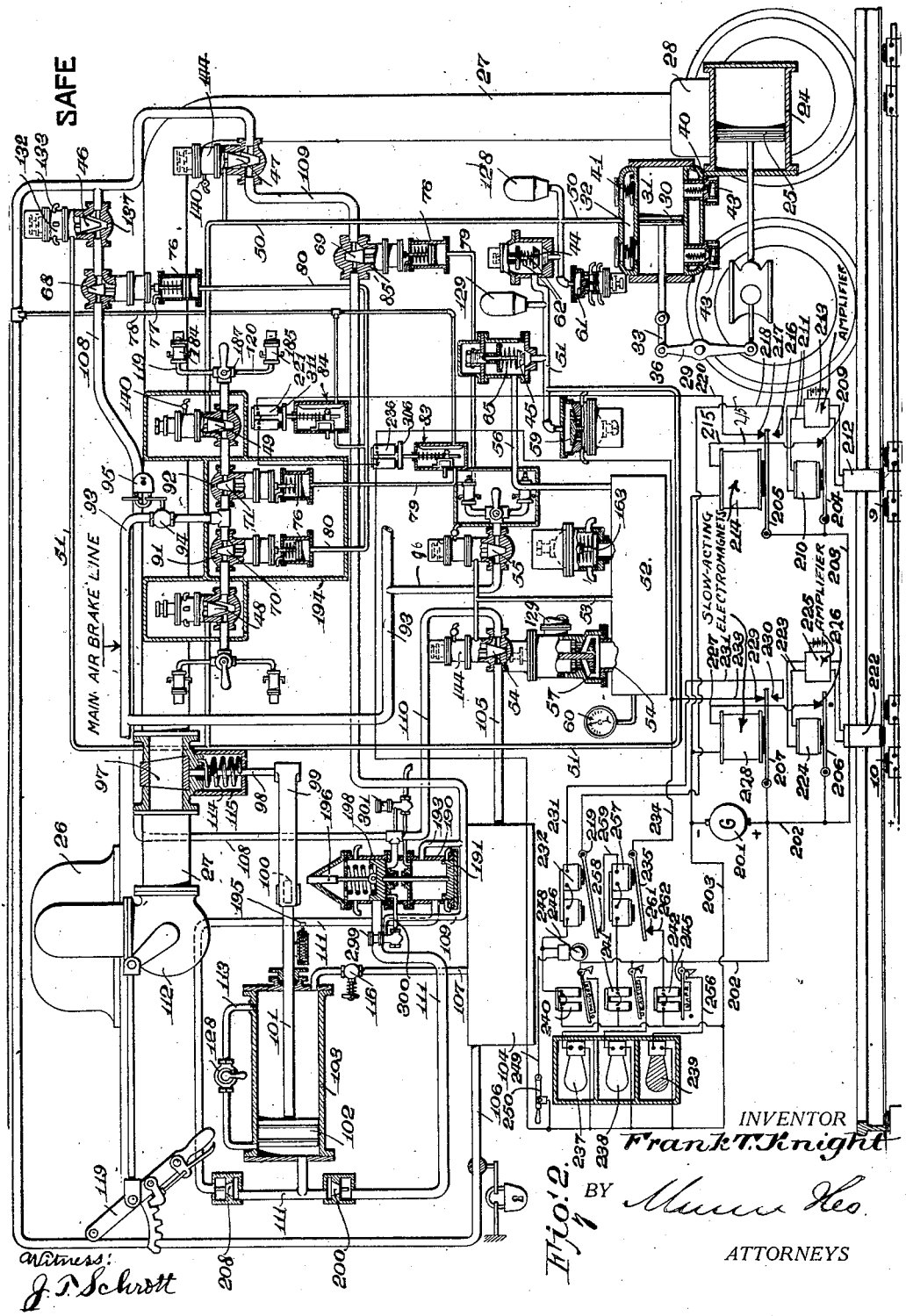

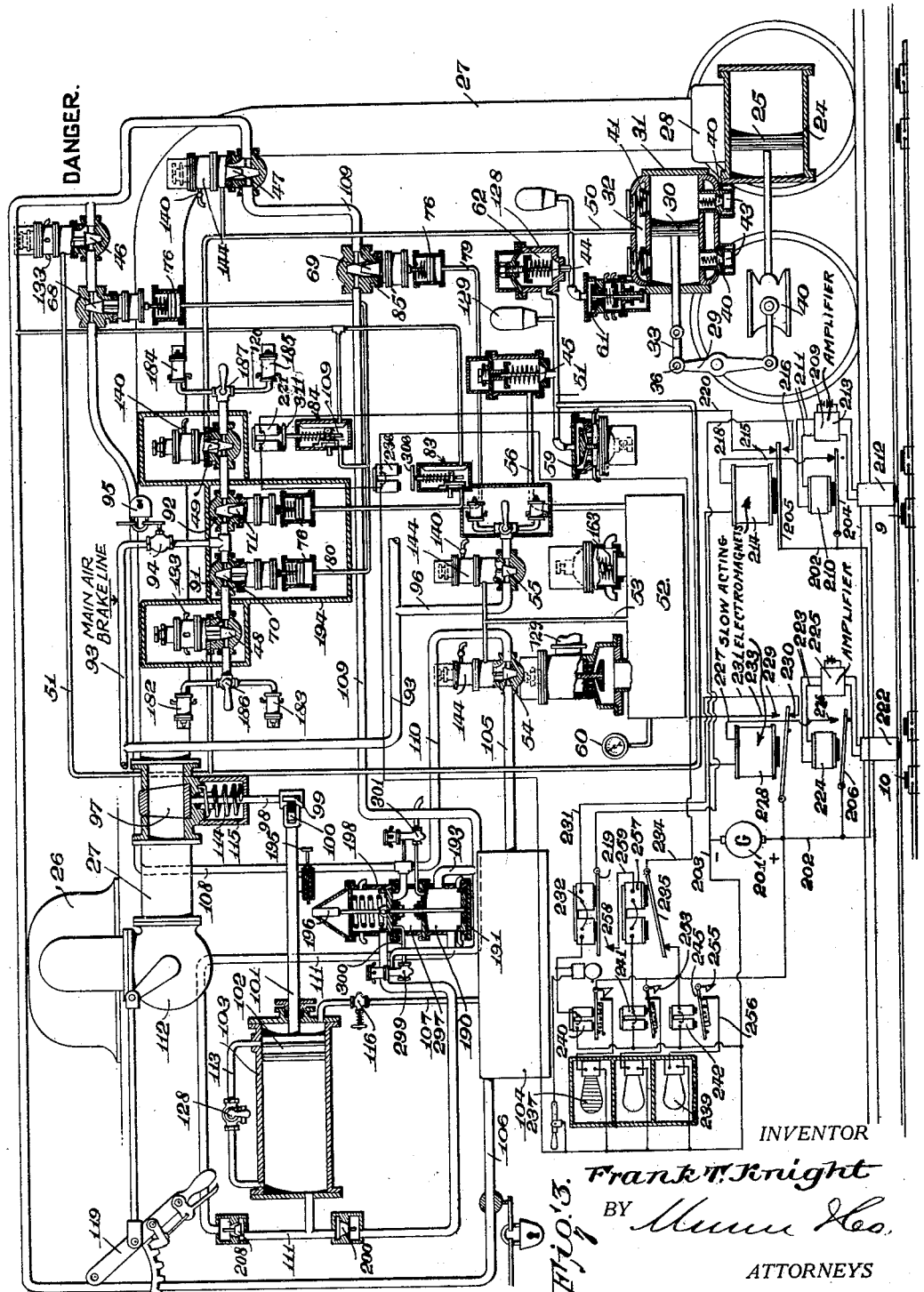

Feb. 3, 1931.  F. T. KNIGHT  1,790,753
TRAIN CONTROL
Filed July 6, 1928  12 Sheets-Sheet 4

Fig. 14.

SAFE

Witness:
J. F. Schrott

INVENTOR
Frank T. Knight
BY
ATTORNEY

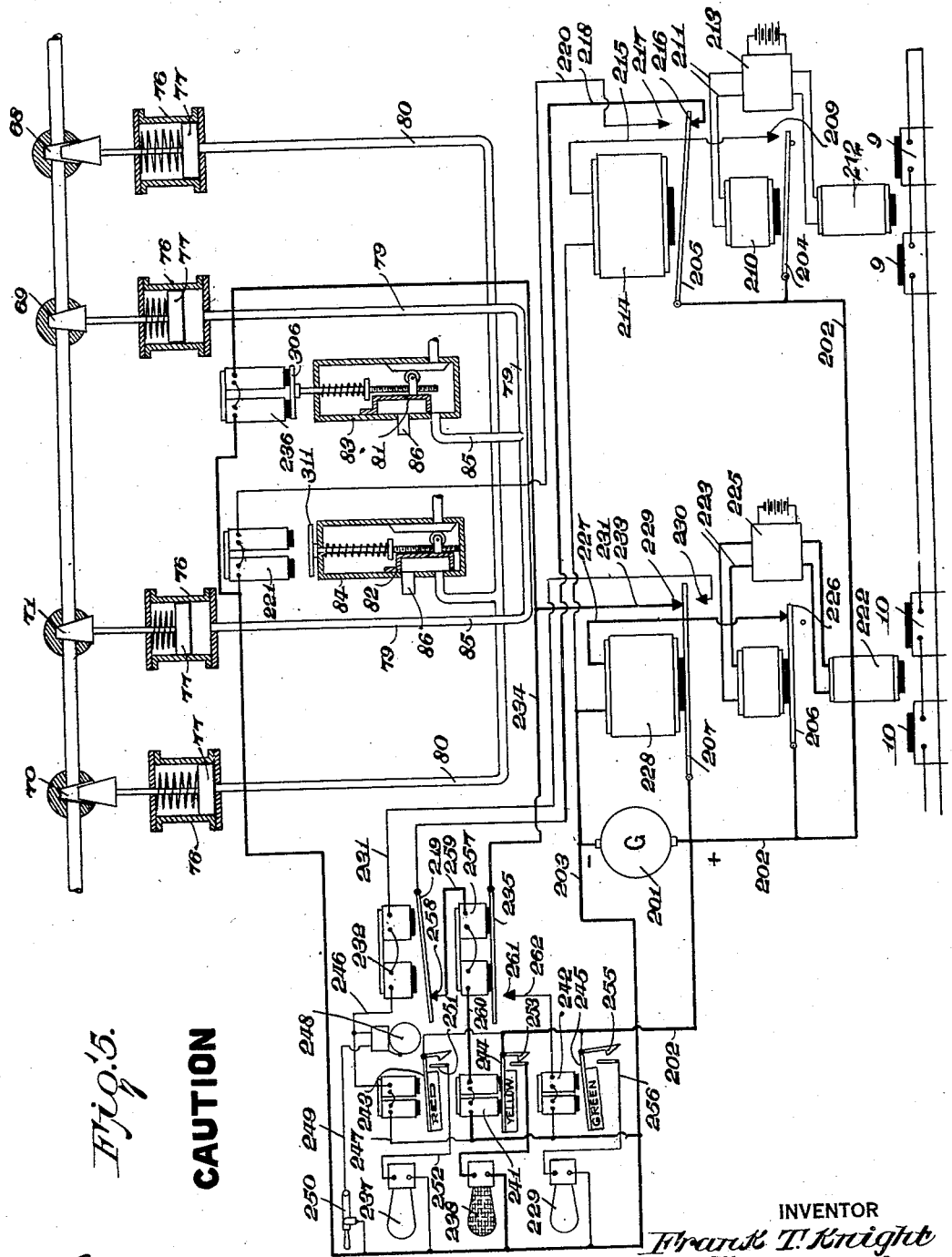

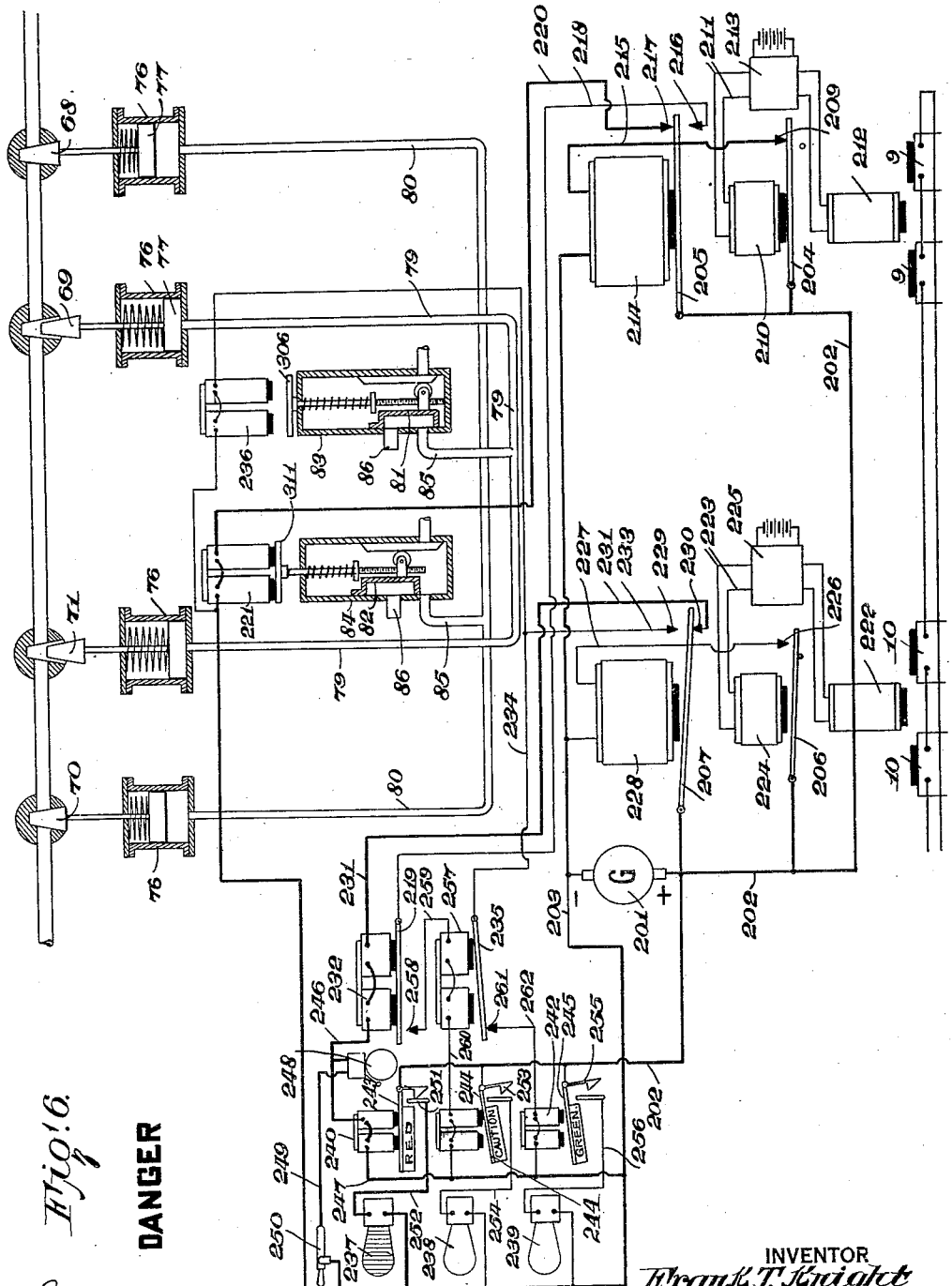

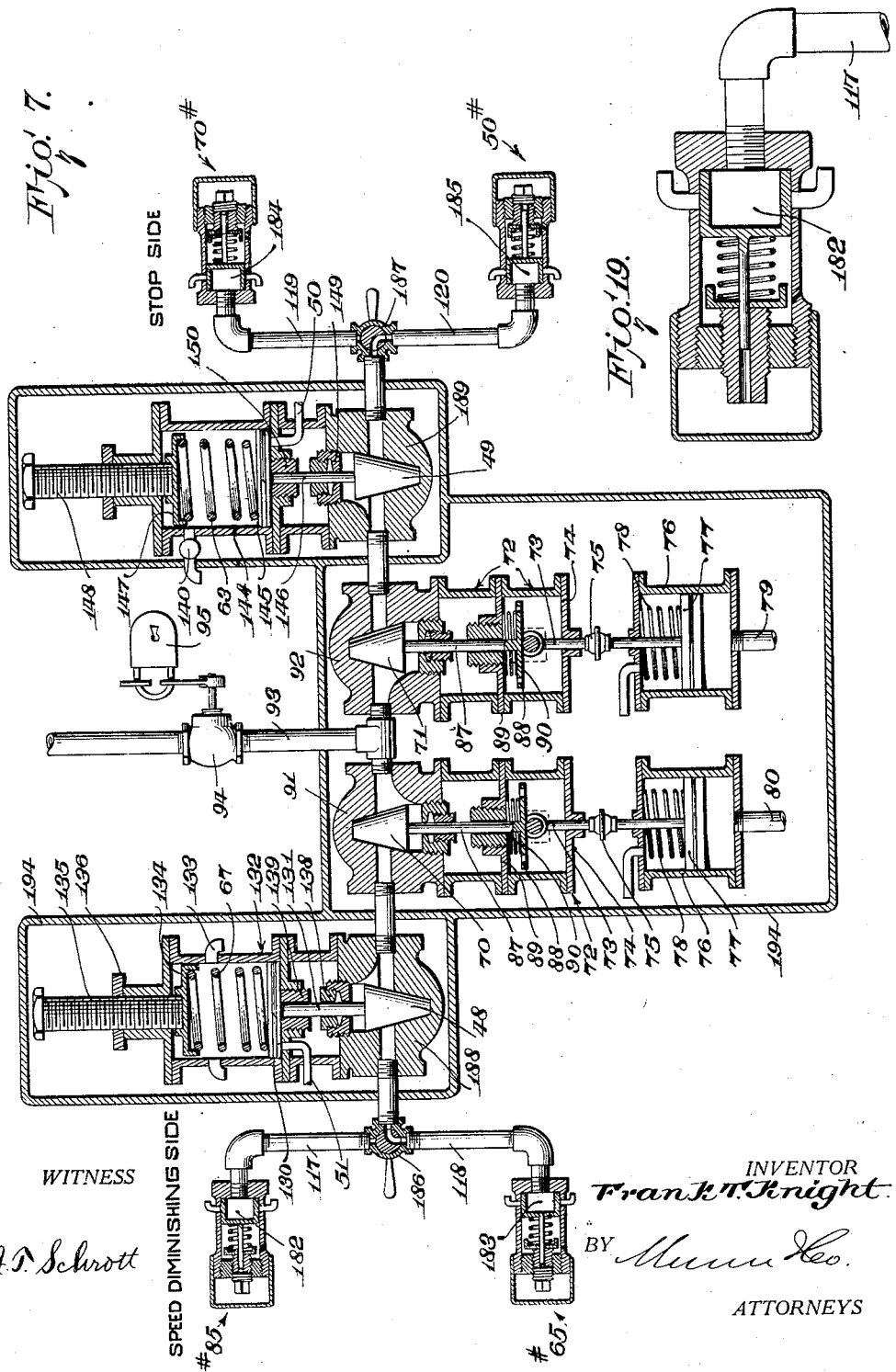

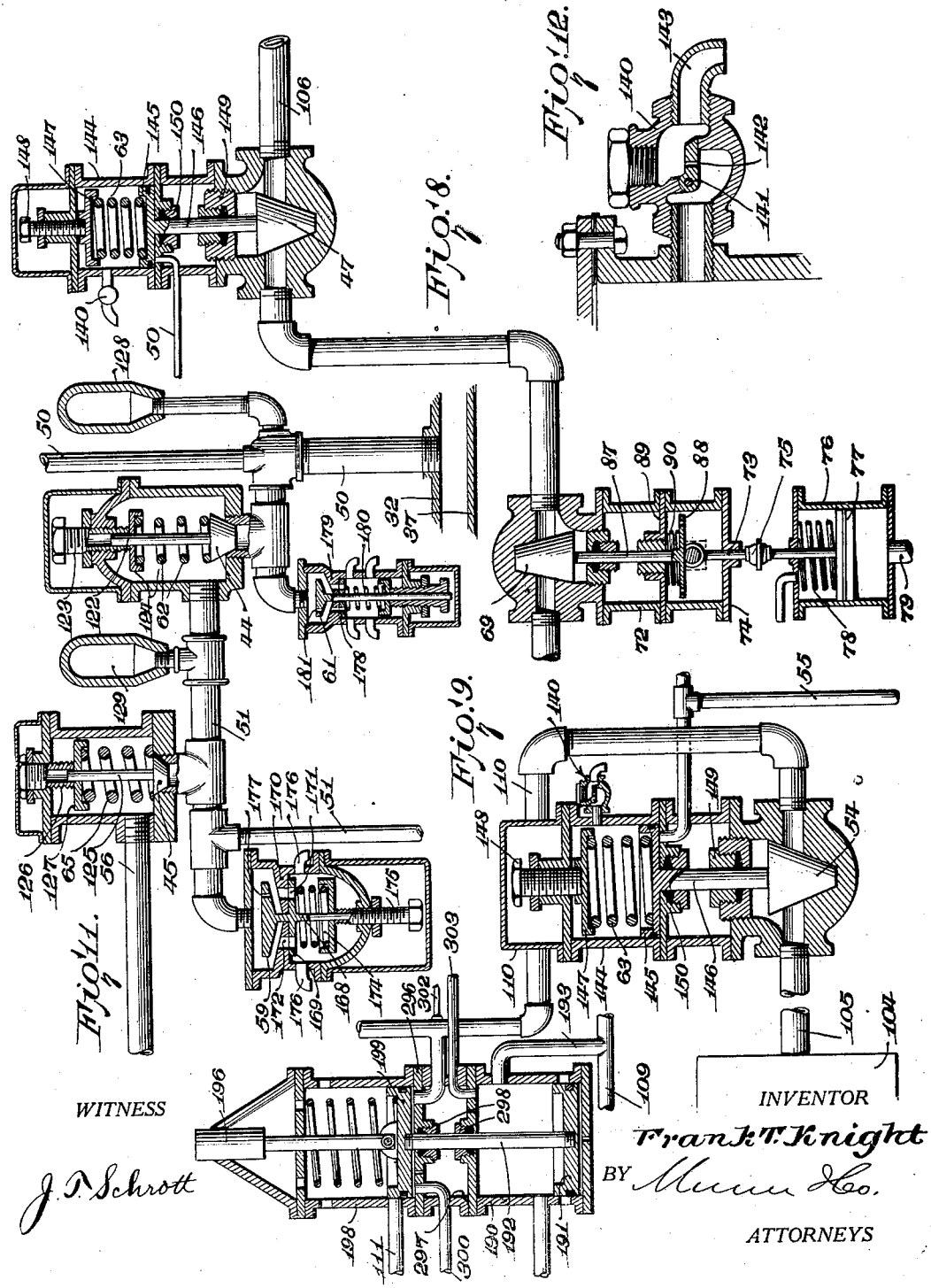

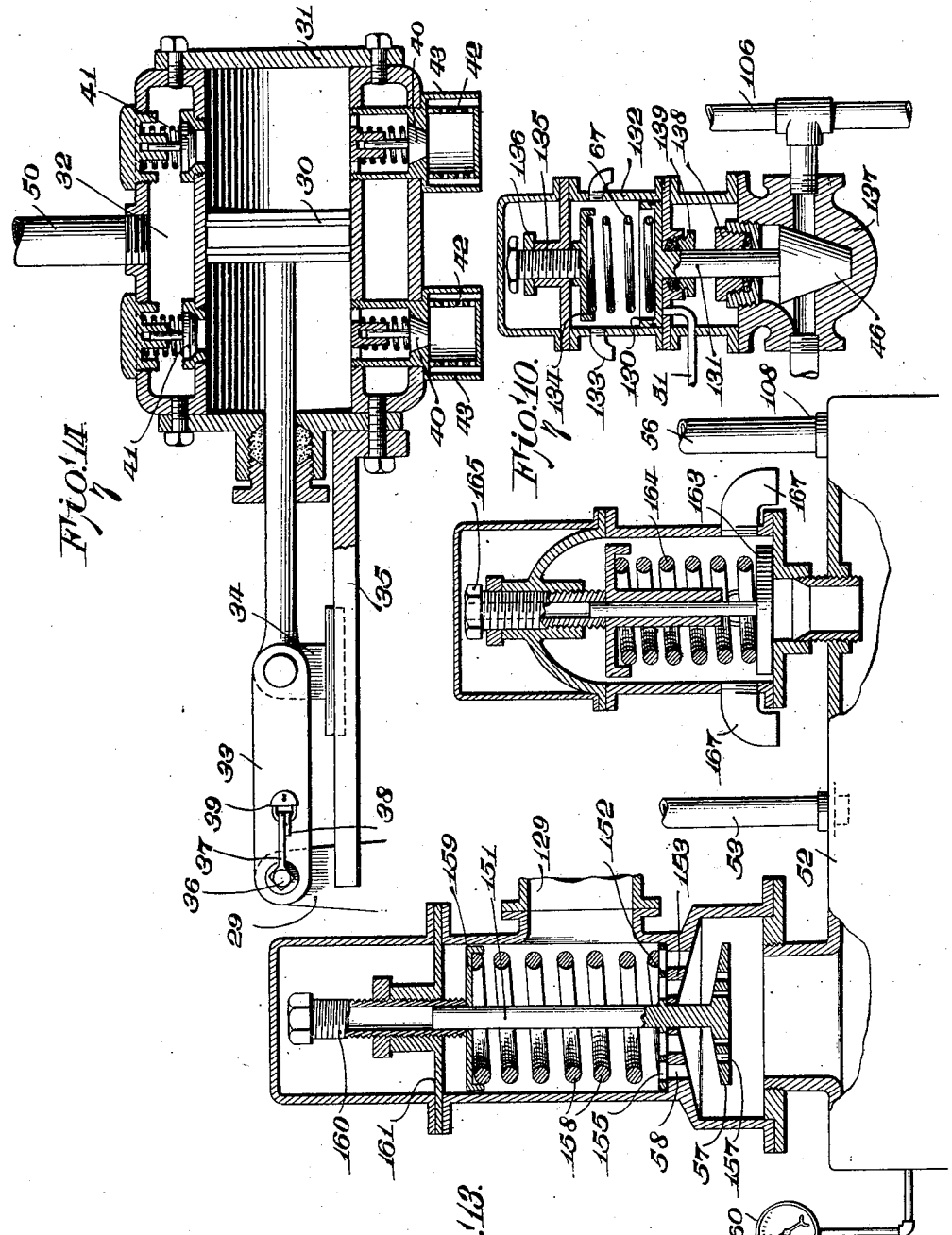

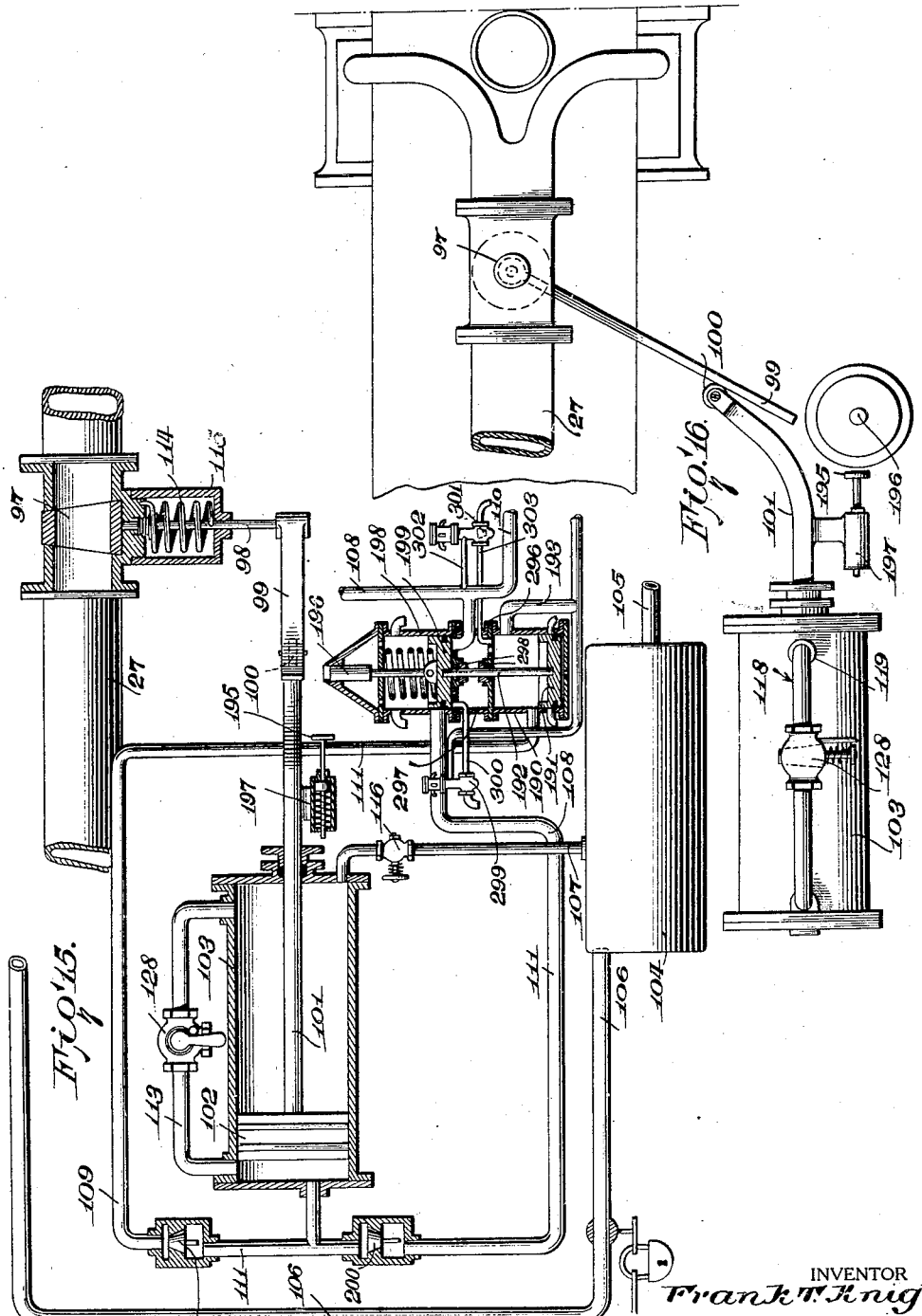

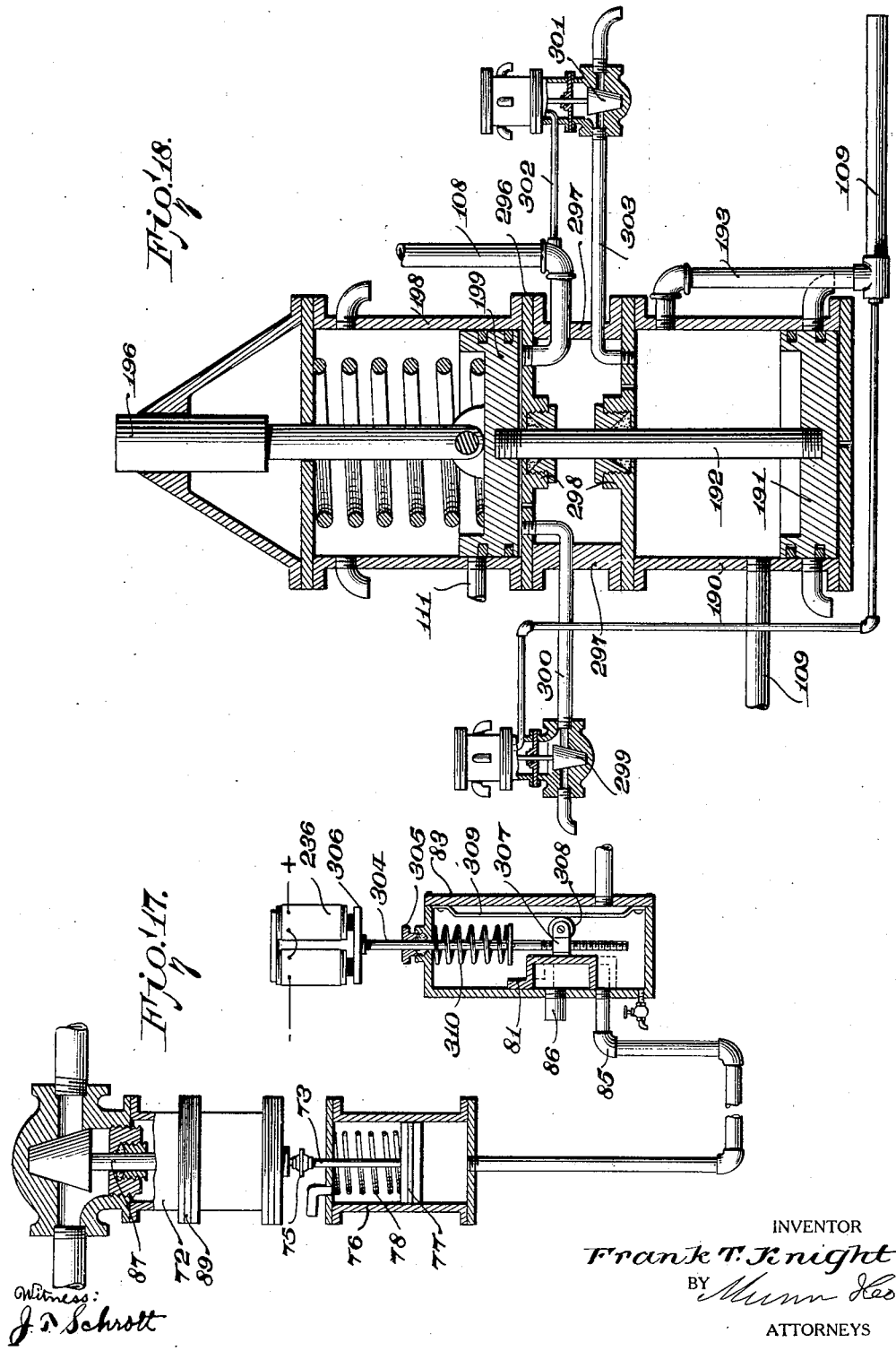

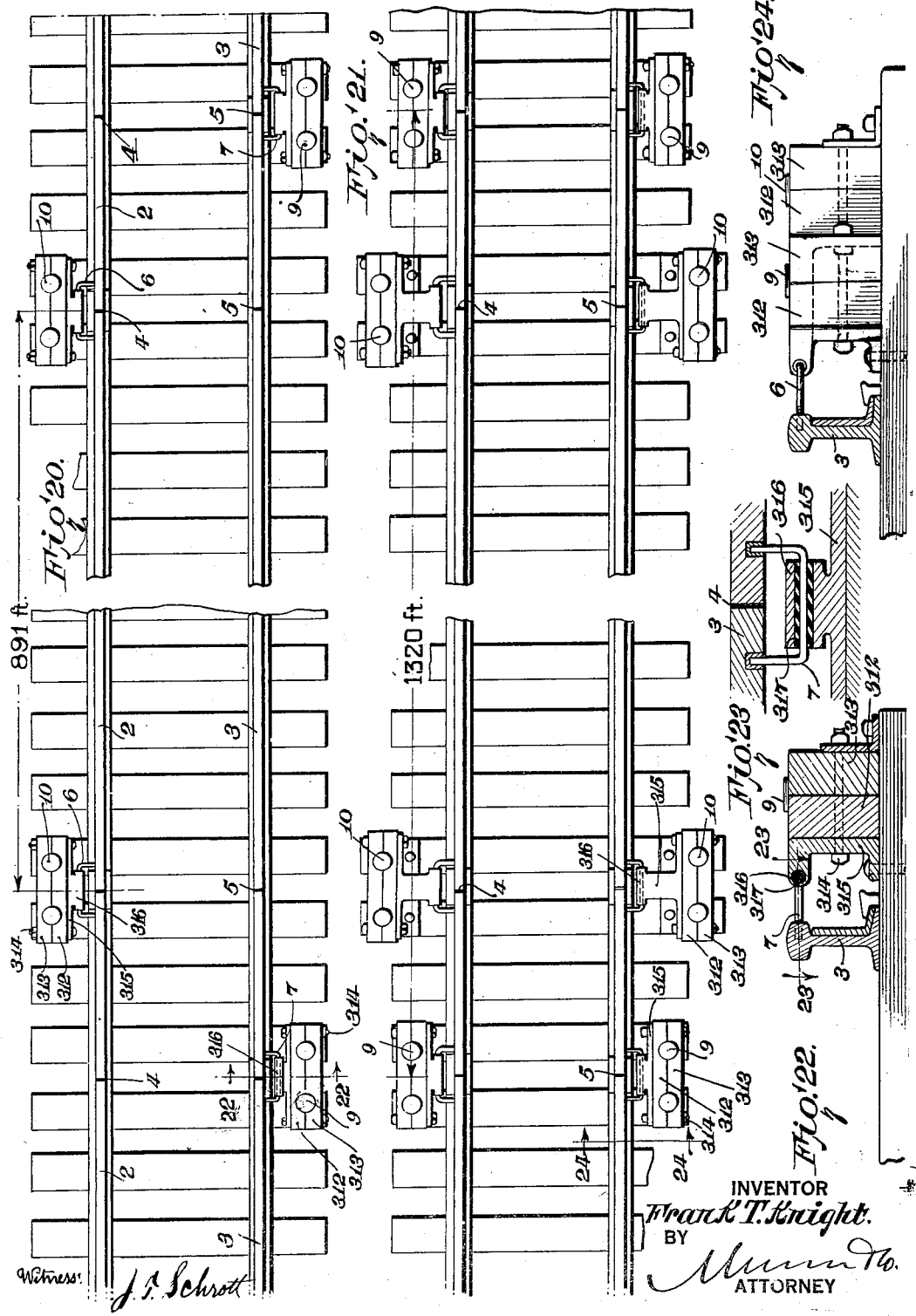

Patented Feb. 3, 1931

1,790,753

UNITED STATES PATENT OFFICE

FRANK T. KNIGHT, OF PITTSBURGH, PENNSYLVANIA

TRAIN CONTROL

Application filed July 6, 1928. Serial No. 290,792.

This invention relates to improvements in train controls, and it consists of the constructions, combinations and arrangements herein described and claimed.

An object of the invention is to provide apparatus for automatically either diminishing the speed of a train or stopping it entirely, these functions depending upon the existence of energizing current in one or another of a series of sets of electromagnets to cause the stopping of the train.

Another object of the invention is to provide a train control apparatus so designed that the speed of a train will be reduced at predetermined places of importance such as crossings, cross-overs and the like.

Another object of the invention is to provide an automatic train control of the closed circuit type, so-called on account of the various electrical circuits being closed during the normal and safe operation of a train and opened upon the occurrence of a mal-operation, for example, a short circuit, grounded connection, broken wire, failure of the electric current either by breakage or removal of the source of current, etc.

Another object of the invention is to provide a train control in which sets of electromagnets are located along the track in definitely spaced groups constituting the so-called track component, said electro-magnets although connected to but insulated from the rails being arranged to hold certain bond wires which electrically connect the rails, so that either the inadvertent removal or breakage of the electro-magnets or bond wires will cause the display of a danger signal and the stopping of the train.

Another object of the invention is to provide a train control wherein the magnetic fields of the track component are made to govern the train component for the safe or cautious running of the train.

Another object of the invention is to provide a train control which is readily adaptable to either a 70, 90 or 110 pound air brake pipe pressure.

Other objects and advantages will appear in the following specification, reference being had to the accompanying drawings in which, Figure 1 is a diagram illustrating several blocks of a railway equipped with the electrical track component of the improved train control, Figure 2 is a diagram of the train-carried apparatus or train component of the automatic control, the parts being in the normal or safe running position, Figure 3 is a view similar to Figure 2 showing the parts in the danger position, Figure 4 is a diagram of the electrical relay mechanism alone showing the positions assumed by the parts under safe running conditions, Figure 5 is a view similar to Figure 4 showing the positions assumed by the parts under a cautious running condition, Figure 6 is a view similar to Figure 4 showing the position of the parts under a dangerous running condition, Figure 7 is a sectional view of the valve cabinet and the main brake line air escape valves contained therein, Figure 8 is a sectional view of one of the automatically operated valves with its associated valve, Figure 9 is a sectional view of another one of the automatically operated valves with the associated stop which it controls, Figure 10 is a sectional view of an automatic valve largely on the order of the valves in Figures 8 and 9, Figure 11 is a sectional view of the valve mechanism associated with the air compressor, Figure 12 is a detail sectional view of one of the vacuum valves used in connection with the automatic valves in Figures 8 and 9, and with other similar valves subsequently described, Figure 13 is a detail sectional view of the relay valves of an auxiliary reservoir, Figure 14 is a sectional view of the air compressor mentioned in connection with the description of Figure 11, Figure 15 is a sectional view of the valve cylinder and parts associated therewith, which controls the closing of the main steam valve, Figure 16 is a plan view of the foregoing valve cylinder and its associated parts, Figure 17 is a detail sectional view of one of the four vent valves and the associated electrically actuated slide valve, Figure 18, is a detail sectional view of the stop and its associated operating mechanism, Figure 19 is a detail sectional view of one of the escape valves associated with certain ones of the foregoing vent valves, Figure 20 is a detail plan view illustrating the application of the electro-magnets to the track component and the rails as in a double track railroad, Figure 21 is a plan view illustrating the application of the foregoing electro-magnets to the rails as in a single track railroad, Figure 22 is a detail cross section taken on the line 22—22 of Figure 20, Figure 23 is a detail horizontal section taken on the line 23—23 of Figure 22, Figure 24 is a cross section taken on the line 24—24 of Figure 21.

This invention is an improvement on the train control disclosed in the patent granted to Frank T. Knight on February 17, 1925. No. 1,526,750. The structure has been modified in a number of respects in order to improve the general construction and to meet the several requirements for an efficient automatic train control as laid down by the Bureau of Safety of the Interstate Commerce Commission. In order that the description may be conveniently followed it is divided into subjects which individually deal with the track component, the fluid valve mechanism of the train component, electrical relay mechanism of the train component and a summary of the operation.

*The track component*

Figure 1 illustrates the general arrangement of the track component which is electrical in character. Figures 20 to 24 illustrate the mechanical details thereof. The railroad track, generally designated 1, is shown divided into blocks A, B, C, D and E.

Each of the foregoing blocks is regarded as being 1 mile long. In practice the rails 2 and 3 (Fig. 20) are 33 feet long. The rails are insulated from each other by the interposition of the insulating pads 4 and 5 between the adjoining ends. However, the rails are bonded as at 6 and 7 in order to establish a desired electrical continuity. The rails thus become the conductors for a local battery 8 in each block.

Electro-magnets 9, herein known as the diminishing magnets, are located at one side of the track in the double track system, while electro-magnets 10, herein known as the stop magnets, are located on the opposite side of the track. Inasmuch as it is a consideration herein to place the various magnets at the joints of certain rails the diminishing magnets have been indicated as being separated 1320 feet, this spacing producing a magnetic impulse in the diminishing relay mechanism of the train component every 15 seconds when the train is running at 60 miles per hour. The distance 1320 feet represents the length of 40 rails.

The stop magnets 10 are located 891 feet apart, this representing the length of 27 rails. These magnets will produce a magnetic impulse in the stop relay mechanism of the train approximately every 10 seconds when the train is running at 60 miles per hour. The various electro-magnets may be arranged in pairs as shown in Figure 1.

Each block has a local battery. The battery 8 is connected with the rails 2 and 3 at one end of the block A, for example, by means of wires 11 and 12. Wires 13 and 14 connect the corresponding rails at the other end of the block with the electro-magnet 15 of a current relay which includes the armature 16 and contact 17. The armature 16 remains attracted so long as the local circuit remains intact. Short circuiting of the battery, as by the presence of a train in the block, will deenergize the relay magnet 15 and permit the armature 16 to drop away from the contact 17.

Energization of the diminishing and stop magnets 9 and 10 is accomplished by a current source independent of the local batteries 8. This source comprises the generator 18 or its equivalent. The current from the generator is conducted over line wires 19 and 20 which are co-extensive with a predetermined length of railway. The illustration in Figure 1 shows the line wires extending over approximately 5 blocks. The line wires may extend over a greater or smaller number of blocks.

The armature 16 of each current relay 15 is connected with the line wire 19. The contact 17 of each current relay is joined with a wire 21 that connects the stop magnets 10 of one block, for example the block A, with the diminishing magnets 9 of an adjacent block, for example the block B, whence a current return is afforded by a wire 22 which is connected with the line wire 20. The magnets mentioned are connected in series. The wire 21 is a current conductor common to the diminishing and stop magnets of adjacent blocks.

A train T is shown occupying block B. The short circuiting of the local battery 8 of block B deenergizes the relay 15 of that block permitting the armature 16 to fall away from the contact 17. Current from the generator 18 by way of the line wire 19 is thus denied the stop magnets 10 and diminishing magnets 9 of blocks C and D respectively. The operation of the diminishing mechanism of a train entering block D would be established by the deenergization of the track diminishing magnets 9. The operation of the stop mechanism of a train entering block C would be established by virtue of the deenergization of the track stop magnets 10.

Semaphores 23 may supplement the track component. These are to be operated by mechanism neither shown nor concerned with the invention. It is ordinarily presumed that the engineer will observe and heed the semaphore signals set against him, but inasmuch as it often hapens that he does not, by reason of possible sudden illness and other causes, it is the purpose of the invention to supplement the manual supervision of the train by the engineer with the automatic control already disclosed in part. As has been indicated, this control is capable of either diminishing the speed of the train or stopping the train entirely according to the condition of the block immediately ahead of a particular semaphore.

*The fluid valve mechanism* comprises all of the various types of valves aboard the locomotive employed in controlling the compressed air present either in the main air brake line or produced by a compressor which is associated with the engine piston. It also relates to the mechanism by which the flow of steam to the engine cylinder is controlled.

Attention is directed to Figures 2 and 3. The engine cylinder 24 has a piston 25 which is operated by steam conducted from the steam dome 26 by a pipe 27. The admission of steam to the cylinder is controlled by a suitable valve mechanism in a valve chest 28 in any well known manner, the valve mechanism not being shown. The reciprocation of the piston 25 actuates a pivoted rocker 29 which operates the piston 30 in a cylinder 31 to thereby compress air into a chamber 32 that surrounds the cylinder. The rocker is connected to the compressor piston by a link 33. The piston rod has a slide 34 (Fig. 14) which moves upon a guide 35.

The pin 36 that joins the rocker 29 with the link 33 is of a removable nature. It has a perforated stem 37 that is engageable with a perforated lug 38 on the link 33. A lock 39 is applied in the perforations to secure the stem and lug. Removal of the lock is intended to permit removal of the pin so that the rocker and link may be disconnected. The compressor 30 will thus be rendered inoperative. This provision would come into use under a circumstance described later.

Pairs of valves 40 and 41 control the admission of air into and from the cylinder 31 under the action of the piston 30. The pair 41 permits the discharge of the air into the compression chamber 32. The inlets of the valves 40 are screened at 42 to prevent the drawing in of cinders and other objectionable foreign matter. Surrounding baffles 43 aid in minimizing the entrance of such foreign matter and have the additional advantage of deflecting rain water.

Valves 44, 45, 46, 47, 48 and 49 herein generally known as automatic opening valves, receive compressed air from the chamber 32 whence the air is distributed by a primary air line 50 and a branch air pipe 51. The first of these pipes has direct connection with the valves 44, 47 and 49. The second pipe has direct connection with the valves 45, 46 and 48. When the engine is running at the rate of at least 15 miles per hour, which is herein considered a medium speed, and the track is in a safe condition, the piston 30 will compress air to a pressure sufficiently high to hold the foregoing valves open.

Other automatic opening valves are incorporated in the train component, but these are at present closed because the pressure of air in an auxiliary reservoir 52 with which they have communication, is not sufficient to open them. A pipe 53 leads from the auxiliary reservoir to the other opening valves 54 and 55.

Air is not admitted to the branch pipe 51 until the primary valve 44 is unseated. Unseating of the valve 45 by air from the branch pipe 51 permits the entrance of compressed air to the auxiliary reservoir 52 by way of a pipe 56. Excessive air is permitted to escape from the reservoir 52 through an automatic closing valve 57 and coacting vents 58 until the pressure recedes to a predetermined amount. (See Figure 13).

Minute orifices in the valve 57 are registrable with the vents 58 and prevent the valve from sticking in the closed position prior to opening when a safety valve 163 closes. The safety valve is connected with the auxiliary reservoir. A spring 164 tends to keep the safety valve 163 seated. The tension of the spring is adjustable by the hollow headed stud 165. By virtue of being hollow the stud provides a guide for the stem of the valve. As already indicated, the valve 163 opens only when the pressure of air in the auxiliary reservoir becomes excessive, the spring 164 being made heavier than the spring of any other valve so that the former will open last of all. Upon this occasion the air escapes at the openings 167 in the valve casing.

A second closing valve 59 is situated in the branch 51. This valve has a minute orifice or vent 177 (Fig. 11) for the purpose of establishing communication of the pipe 51 with the atmosphere while the valve 59 is closed, thus relieving the air pressure in the pipe 51 to a slight extent and preventing valves 59, 46 and 48 from sticking in the closed and open positions respectively. This orifice will be of such size as to slightly relieve the pressure in the pipe 51 and allow valves 46 and 48 to close and valve 59 to open whenever the speed of the engine is reduced to 15 miles per hour.

It is to be observed that the closing valve 59 (Figs. 2–11) is much on the order of the valve 57 (Figs. 2–13). The stem 168 which carries the valve 59 also carries a valve plate 169 which is situated at that side of a partition 170 opposite to that on which the valve 59 is situated. The plate 169 and partition have registrable openings 171 and 172 respectively. A spring 174 keeps the plate 169 seated until the speed of the train is increased above medium whereupon the increased air pressure in the branch 51 overpowers the spring and causes the seating of the valve 59. The spring 174 is adjustable by a bolt 175 which carries a plate to support the spring. The valve casing has openings 176 through which the air escapes to atmosphere under normal conditions.

A third automatic closing valve 61 (Fig. 11) is situated in the pipe 50. This valve is similar to the valves 57 and 59 in that it has a companion plate 178 which rests upon the partition 179 under the influence of a spring 180 when not prevented by excessive air pressure. A small vent 181, similar to vent 177, prevents sticking of the valve 61 upon its seat when closed.

The auxiliary reservoir 52 is fitted with a gauge 60 which, in practice, is situated in the engine cab. The function of this gauge is to indicate the pressure at which the valve 57 will close, and the pressure at which the valve 163 will open. The graduations begin at "5" and end at "90", the manner of calibration being such that the numerals will indicate the speed of the train in miles per hour. The air pressure increasing within the reservoir 52 by the increasing action of the compressor 31 upon an increase in the train speed up to certain limits accounts for the foregoing functions.

It is necessary for the valve 44 to open before there can be communication of the branch 51 with the primary air pipe 50. Figure 2 illustrates this valve in the open position. The valve is to be seated by a spring 62 (Fig. 11). The valves 47 and 49 (Figs. 8 and 7) are to be seated by springs 63 and 64 respectively, but the spring 62 of the valve 44 is slightly stronger than the springs of the valves 47 and 49 so that the latter will open before the valve 44 opens.

The valve 45 (Figs. 2 and 11) is to be seated by a spring 65. The valves 48 and 46 (Figs. 7 and 10) are to be seated by springs 66 and 67 respectively, but the spring 65 of the valve 45 (Fig. 11) is stronger than the springs of the valves 48 and 46 so that the latter will open before the valve 45 opens. This makes it obvious that the action of the valve 44 follows that of the valves 49 and 47 while the action of the valve 45 follows that of the valves 48 and 46. The purpose of the arrangement is to permit the valves 49 and 47 to open first and the valves 48 and 46 to open next, whereupon the valve 45 opens and the excessive air escapes to atmosphere through the valve 57 of the auxiliary reservoir 52.

Associated with the respective automatic opening valves 46, 47, 48 and 49 are other valves 68, 69, 70 and 71. Each of the latter valves is alike. The specific description of the valve 69 (Fig. 8) will serve for all, corresponding reference numerals being used for corresponding parts.

The valve stem 87 (Figs. 7, 8 and 17) carries a plate 88 between which and a partition 89 is situated a spring 90. The spring tends to oppose the closing movement of the valve and assists the opening movement when permitted to do so. A two-part cylinder 72 provides a convenient mode of mounting the partition 89 as well as of guiding the extension 73 of the valve stem, a cover 74 performing the latter function.

A universal joint 75 in the extension stem 73 compensates for any lack of alignment between the guide cylinder 72 and a fluid cylinder 76. The stem 73 carries a piston 77 in the fluid cylinder. A spring 78 tends to press the piston toward one end of the cylinder. A pipe 79 connects the fluid cylinders 76 of the valves 69 and 71. A pipe 80 similarly connects the cylinders 76 of valves 68 and 70.

The presence of pressure fluid in the pipes 79 and 80 acts upon the pistons 77 to keep the valves 68, 69, 70 and 71 closed. This constitutes a safe position as indicated by Figure 4. The admission of pressure fluid to the respective pipes is controlled by slide valves 81 and 82. These operate in pressure chests 83 and 84. The slide valves control the fluid passage either into branches 85 or into exhaust ports 86.

Connected between the casings 91 and 92 of the valves 70 and 71 (Fig. 7) is the main air brake line 93 of the train. This line or pipe has a valve 94 which must always be open. A lock 95, appropriately applied serves the latter purpose. The valves 48 and 70 control the diminution of the train speed by causing a partial application of the brakes. The valves 49 and 71 cause the stopping of the train by a total application of the brakes. A branch 96 (Figs. 2 and 3) leads from the pipe 93 to the automatic valve 55 which, like the valves 70 and 71 is now closed. The escape of any pressure from the brake line is thus prevented at the valve 55.

Supplementing the brake applying operation of the valves 71 and 49 and associated with the brake line 93 are the functions of a main steam valve 97 for partially or totally throttling the passage of steam in the steam pipe 27. The stem 98 of this valve has a lever 99 which is engageable by a roller 100 on the rod 101 of a piston 102 in a valve cylinder 103, so-called on account of its function in controlling the steam valve 97.

Air, for the operation of the piston 102 is stored in a main reservoir 104. Air is compressed for the purpose of storage in the reservoir 104 by a suitable compressor not shown. The reservoir 104 has three pipe outlets 105, 106 and 107. Each of these pipes has ultimate communication with the valve cylinder 103. When provision is made for a clear passage of air through the pipe 105 the piston 102 is moved through only a part of its stroke and partially closes the main steam valve 97 in agreement with a speed diminishing operation. According to the showing in Figure 2, the passage of air in the pipe 105 is obstructed by the closed automatic opening valve 54.

A clear passage for air through the pipe 106 from the reservoir 104 will produce a full stroke of the piston 102 so that the main steam valve 97 is closed entirely in agreement with a stopping operation. The pipe 106 has common connection with one side of each of the valves 46 and 47. The continuations 108 and 109 of the pipe 106 respectively join and communicate with pipes 110 and 111 which, as can readily be traced in Figures 2 and 3, are practically nothing but extensions of the pipe 105. Although the valves 46 and 47 are open in Figure 2, the passage of air into pipes 108 and 111 is checked by the valves 68 and 69.

In addition to the main steam valve 97 the pipe 27 has a throttle valve 112 which is capable of manual operation by a lever 119 in the engine. It is intended that the valve 97 shall normally be opened. For this purpose one end of a spring 114 is connected with the valve stem 98. The other end of the spring is connected with the valve body. A casing 115 conceals and protects the spring. The spring is of such nature as to tend to open the valve 97.

The latter action of the spring causes the lever 99 to follow the roller 100 upon recession of the piston 102 in the cylinder 103. This recession of the piston is caused by opening a valve 116 in the third pipe 107 leading from the reservoir 104 to the right end of the cylinder 103. A spiral spring appropriately connected to the handle and body of the valve 116 keeps the latter normally closed. A by-pass 113 (Figs. 2, 3 and 15) has the ends connected to the extremities of the cylinder 103. It includes a three-way cock 128 by means of which either end of the cylinder may be placed in communication with the atmosphere.

In order to reset the valve piston 102 the three-way cock 128 must be held so that the left end of the cylinder 103 may communicate with the atmosphere. The valve 116 is now opened, as previously stated, admitting compressed air to the cylinder 103 from the reservoir 104 to drive the piston 102 to the left. The springs associated in practice with the handles of valves 116 and 128 cause the latter to resume the normal position when the handles are released. Such positions are a closure of the valve 116 and an opening of the right end of the cylinder 103 to atmosphere.

Various ones of the valves already mentioned are now reverted to for the description of specific structure. The valve 44 (Figs. 2, 3 and 11) has a stem 122 which is guided by a hollow bolt 123. The bolt is threaded and provides for making adjustments of the spring 62. The spring bears against a flanged plate 124 on the concealed end of the bolt. The spring 62 keeps the valve 44 seated until the air in the chamber 32 reaches a sufficient pressure to unseat the valve and permit the air to enter the branch 51.

The associated structure of the valve 45 is similar to that of the valve 44. The stem 125 is guided in the hollow adjustable bolt 126. This bolt terminates in the flanged plate 127 against which the upper end of the spring 65 rests. The other end of the spring bears against the valve 45 tending to close it, but under normal safe running conditions as in Figure 2, the valve is held open by virtue of the pressure of air beneath it.

A flanged plate 130 (Fig. 10) carried at the upper end of the stem 131 of the valve 46 receives the thrust of the spring 67 to thereby seat the valve. The so-called flanged plate 130 is actually the piston which operates in the cylinder 132 by which the spring is confined. It is the air entering the cylinder 132 from the pipe 51 beneath the plate or piston 130 that reaches the latter and opens the valve.

Freedom of the opening and closing movements of the valve 46 is assured by the provision of vents 133 in the cylinder 132. The ready passage of air from and into the space above the piston 130 upon the raising and lowering movements of the piston permits the prompt opening and closing of the valve 46. A flanged plate 134 is carried by a bolt 135 for receiving the end of the spring 67 and permitting adjustments thereof. The adjustments of the bolt are fixed by a nut 136. The body 137 of the valve 46 supports the cylinder 132. It is to be observed that both the casing and cylinder are equipped with packing glands 138 and 139 so that there may be no leakage of air around the valve stem 131.

The valve 47 (Fig. 8) is similar in construction to the valve 46. The former includes a vacuum valve 140 in place of the vents 133 of the valve cylinder 132 (Fig. 10). Several of the vacuum valves are used in the mechanism and the detailed illustration of one of the valves as in Figure 12 will suffice for all. This valve comprises a casing which contains a hinged flap 141. This flap is provided with a minute orifice 142. The outlet 143 of the valve is turned downward so that cinders and dust may not readily enter the valve casing.

A cylinder 144 (Fig. 8) houses the spring 63 which presses against the plate or piston 145 on the stem 146 to thereby tend to seat the valve 47. An opposing plate 147 on an adjustable bolt 148 provides for the adjustment of the spring 63. Packing glands 149 and 150 prevent the escape of air around the stem 146. Having the structure of the vacuum valves 140 (Fig. 12) in mind it is readily seen that the valve 47 will open promptly when air is admitted under pressure beneath the piston 145 but will seat slowly under the pressure of the spring 63 when the air pressure is relieved. In the first instance the flap 141 swings open on its hinge, in the second instance the flap is closed, and the only air admitted to the cylinder 144 enters at the orifice 142. This orifice is very small so that the air may enter but slowly.

Valve 48 on the speed diminishing side of the apparatus (Figs. 3 and 7) is precisely like valve 46. The detailed description of the latter in connection with Figure 10 and the reference characters therefore serve for both. The valves 49, 54 and 55 are like the valve 47, and the detailed description of the latter in connection with Figure 8 as well as the reference characters therefore serve for all. Figure 13 illustrates the detail structure of the automatic closing valve 57. This valve is carried by a rod 151 which in turn carries a valve plate 152. The arrangement constitutes a double valve. The individual valve members are disposed on opposite sides of a partition 153 formed in the casing 154.

A pipe 129 makes connection between the casing 154 and the smoke stack of the engine (not shown), so that the air escaping upon the opening of the valve 57 may be carried away through the stack where it will assist the draft and at the same time avoid the making of an objectionable hissing noise. Automatic closing valve 57 closes when the escape of air therethrough increases due to an increase of pressure when the speed of the train is above the specified schedule of speed as will appear hereinafter.

The openings 58 and 155 in the partition 153 and valve plate 152 respectively are of substantially the same size. They effect complete registration when the plate is seated as shown. The valve 57 has openings 157 which are smaller than the openings 58 and furthermore are situated in line with solid portions of the partition 153. The result of the arrangement is to cut off the flow of air when the valve 57 is seated against the underside of the partition. A spring 158 tends to oppose the seating of the valve and causes the seating of the valve plate 152.

The valve plate 152 remains seated so long as the pressure of the air escaping from the auxiliary reservoir 52 is less than that exerted by the spring 158. When the pressure of such escaping air exceeds that of the spring the latter is then overcome and the valve 57 is moved to the closed position. A plate 159, carried by a threaded bolt 160 which is adjustable in the cover plate 161 of the valve casing, furnishes the support for the upper end of the spring 158. The bolt 160 provides for the adjustment of the spring as in instances already named. The bolt is hollow and thus provides a guide for the valve rod 151.

Branches 117 and 118 are associated with the diminishing valve 48 (Fig. 7). Branches 119 and 120 are associated with the stop valve 49. The respective sets of branches are connected by three-way cocks 186 and 187. These are opened and closed by hand in accordance with the particular brake line pressure carried. As previously indicated, three standard air brake pipe pressures are used for different kinds of trains, namely, the 70, 90 and 110 lb. brake pipe pressures.

Some brake equipments are made to supply two of these different pressures, and in order to adapt the foregoing fluid pressure mechanism to such equipments, provision is made for instantly shifting from one brake pipe pressure to another. It is for this purpose that certain vent valves are provided in duplicate for each of the valves 48 and 49. The purpose of the cocks 186 and 187 is to cut out the particular vent valve not desired.

Suppose the brake equipment adaptable either to a 90 or 70 lb. pressure. The vent valves 182 and 184 (Fig. 7) would be set to open at pressures of 85 lbs. and 70 lbs. respectively. Vent valves 183 and 185 would be set to open at 65 lbs. and 50 lbs. respectively. If the equipment were actually carrying 70 lbs. pressure the valves 182 and 184 would be cut out by the 3-way cocks 186 and 187, the adjustment of the latter being made so that the valves 183 and 185 only may function.

If the 90 lb. air pressure were being carried the conditions would be reversed. All of the various valves are contained in casing 194. This may comprise only a single casing designed to contain all of the mechanism, or the casing may be divided into a plurality of compartments as illustrated. The casing must be equipped with a door or doors which may be locked so that none but an authorized person may have access to the valves.

The reason for setting the various vent valves to open at the various pressures stated is that ordinarily an approximately 5 lb. reduction of brake pipe pressure is required to make a service application of the brakes, and approximately a 20 lb. reduction of the pressure for a total application of the brakes. The valves 182 and 183 are therefore set to open upon a 5 lb. reduction while the valves 184 and 185 are set to open upon a 20 lb. reduction. As already indicated, the brake line 93 is regarded as carrying either a 90 or 70 lb. air pressure.

When it is known that a train will at all times carry air in the brake line at only one pressure one set of the vent valves may be dispensed with. The automatic valves 48 and 49 (Figs. 3 and 7) will close after a speed diminishing or stop operation thus cutting off communication of the brake pipe 93 with the particular vent valves then functioning. The closure of the valves 48 and 49 occurs through the lack of sustaining air pressure in the pipe 50 and branch 51, the deficiency being caused by a diminution of air pressure in the chamber 32 by the reduction of the train speed.

Attention is now directed to the so-called valve cylinder 103 (Figs. 2, 3 and 15). The piston rod 101 carries an abutment 195 arranged to engage a stop 196 when the latter is projected into the path of the former. Such engagement insures the stopping of the piston 102 substantially midway of its stroke in the cylinder 103. A partial closure of the main steam valve 97 would thereby result, this being in agreement with a speed diminishing operation at which time a venting of air occurs at the valve 183. The abutment 195 has a yieldable mounting in the casing 197 which carries it upon the rod 101.

Inasmuch as both pipes 108 and 110 (Figs. 2 and 3) communicate with the bottom of the cylinder 198 in which the stop piston 199 is situated it follows that the stop 196 may be raised into the path of the abutment 195 under two conditions. One occurs when the train speed becomes excessive, whereupon the pressure of air in the auxiliary reservoir 52 rises rapidly. Not only does this result in a closure of the valve 57 (Fig. 13) and a relief of the pressure at the safety valve 163, but also an opening of the valves 54 and 55 which up to this time are closed.

The opening of the valve 54 admits air from the reservoir 104 to the cylinder 198 by way of pipes 105, 110 causing the raising of the piston 199 (Fig. 15) so that the stop 196 moves into the path of the abutment 195. Air under pressure passes into the pipe 111 which is then in communication with the pipe 110 through the cylinder 198. A back check valve 200 is unseated and air enters the left end of the cylinder 103. As soon as the piston 102 has advanced sufficiently far along the cylinder 103 to agree with an engagement of the abutment 195 with the stop 196 motion of the piston ceases. An application of the brakes occurs by action of the adjacent enclosed vent valves (Figs. 2 and 3) at whatever brake line pressure which is being carried, similarly to the action of vent valves 182, 183 and 184, 185. Thus it will be seen that the result of opening the valves 54, 55 is not only to partially cut off the driving power but also to cause the automatic application of the brakes when a maximum-speed limit is exceeded.

The second occasion upon which the stop 196 (Figs. 2 and 15) is elevated and the foregoing operation of moving the piston 102 part way of the cylinder 103 occurs when the valve 68 is permitted to open. This happens when the "caution" position (Fig. 5) is assumed. The circumstances under which the latter position is arrived at is described under the electrical relay mechanism. The valve 68, having opened, permits air to pass from the reservoir 104 through the pipe 106 into the branch 108 and into the casing 198 (Fig. 15) with the result already described. The main steam valve 97 will be partly closed and the train speed will be thereby diminished.

Situated below the stop casing 198 is an auxiliary casing 190 (Figs. 9, 15 and 18). A piston 191, operative in the auxiliary casing, has a rod 192 connected with the piston 199, mentioned before. The purpose of the auxiliary piston 191 is to retract the stop 196 from the path of the abutment 195 upon the occasion when complete automatic closure of the steam valve 97 would be required after a partial automatic closure thereof. In such event the necessary air is supplied by a branch 193 of the pipe 109.

The heads of the casings 198 and 190 are connected by a flanged sleeve 297. The heads carry packing glands 298 through which the rod 192 passes. A non-adjustable valve 299 (Figs. 15 and 18) opens by air pressure from the pipe 109 upon the return stroke of the piston 199. The valve is connected with the casing 198 by pipe 300. A similar valve 301 (Figs. 15 and 18) provides for the relief of pressure in the casing 190 upon up stroke of the auxiliary piston 191 when the piston 199 is raised by air pressure from the branch 108. Air pressure from this branch actuates the valve 301 by passage through a small branch 302. The valve 301 is connected with the casing 190 by a pipe 303.

A service application of the air brakes accompanies either of the two foregoing occurrences. Upon increasing the train speed undesirably the valve 54 will open to cause a partial closure of the main steam valve 97 as previously explained. Air will escape from the main air brake line 93 through the valve 55 which is opened simultaneously with the valve 54. Again, the opening of the valve 68 is accompanied by the opening of the valve 70, again causing a partial closure of steam valve 97 and a reduction of the brake line pressure. This is for the reason that these valves are subject to a common control by the pressure chest 84.

The only occasion for the complete closure of the main steam valve 97 (Fig. 2) is when a danger condition exists in a particular block, that condition de-energizing the stop magnets 10 of the posterior block and de-energizing the diminishing magnets 9 of the posterior block next preceding. The de-energization of the stop magnets 10 causes the condition illustrated in Figure 6, while the de-energization of the diminishing magnets 9 causes the condition illustrated in Figure 5. Under the first condition each of the valves 68, 69, 70 and 71 is opened due to the energization of the magnets of the associated pressure chests 83 and 84. Air from the main reservoir 104 will then flow through the pipe 109 and through the then open valve 60, passing a back check valve 208 and entering the left end of cylinder 103. The piston 102 will be caused to perform a full stroke in the cylinder 103. This stroke will be complete for the following reasons:

Air from the reservoir 104 will flow through the pipe 106 and through the open valve 47, mentioned before (Fig. 3), pass through pipe 109 by way of the valve 69 (now open because the train occupies a danger block), through the auxiliary casing 190 and into the left end of cylinder 103 by way of branch 111 and the interposed back check valve 208. The piston 102 may make a full stroke to the right. The existence of air pressure in the auxiliary casing 190 holds the piston 191 down. Since the valves 46 and 68 that might admit compressed air to the left end of the cylinder 103 by way of the casing 198 are normally closed, two reasons become apparent why the stop 196 will not be projected to interfere with the action.

The foregoing full stroke of the piston 102 swings the lever 99 (Fig. 16) the full distance so that the main steam valve 97 is fully closed. The reduction of train speed necessarily following such closure of the valve 97 is accompanied by a reduction of air pressure in the compression chamber 32. The valve 61 will open and the valve 44 will close (see Fig. 11). The valve 44 will close first when the train slows down to low-speed, as for example 10 miles per hour. Valves 47 and 49 close next after which valve 61 opens. This not only causes a further reduction of pressure in the pipe 50, but completely severs the communication of the branch 51 with the pipe 50. Any pressure in this branch is relieved by valve 59 which at this time opens to relieve any remaining air to the atmosphere after valves 45 (which closed first) 46 and 48 (which close next) have closed. At such a time the train speed has diminished to 15 miles per hour, which is taken as an example. There is, therefore the situation of the automatic opening valves 46, 47, 48 and 49 being relieved by the air pressure which formerly held them in the open position (Fig. 2). The result is that these valves will close.

But the valves 46 and 48 (Fig. 3) will close more promptly than the valves 47 and 49, this being due to the fact that the latter are equipped with so-called vacuum valves 140 which retard the closing movement. The pipe 108 is thus promptly disconnected from the system so that air under pressure from the reservoir 104 can enter the cylinder 103 only by way of the valve 47 and pipe 109.

At the same time the vent valves 182 and 183 (Fig. 7) are disconnected from the system by the closure of the valve 48. The vent valves 184 and 185 are still in communication with the system because the valve 49 (Fig. 3) is still open and the valve 71 has been opened. It must be understood that while valve 47 eventually closes, it has not completely closed in the instance given because of the retarding action of the vacuum valve 140. Similarly, in respect to valve 49, it is to be noted that this valve as well as valve 47 are connected by a pipe 50 (Fig. 2), hence a simultaneous action will occur. The result is that air escapes from the main air brake line 93 at the vent valve 185 until a 20 lb. reduction has occured. This causes the total application of the brakes.

Attention is directed to the pressure chests 83 and 84. The detailed structure of one of these, 83 for example, is illustrated in Fig. 17. The slide valve 81 is carried by a valve stem 304 which operates in a gland 305 and carries an armature 306 on that end protruding through the gland to the outside of the chest. The inner threaded end of the valve stem is screwed into a hub 307 of the slide valve, this permitting adjustments of the slide valve in relationship to the stem. The length of the latter is such that the stem will strike the bottom of the chest when the armature 306 is in the released position, and the valve 81 establishes communication of the branch pipe 85 with the exhaust port 86.

A roller 308 carried by the hub 307 rides upon a track 309 and keeps the slide valve 81 in firm contact with the wall of the chest. A spring 310 tends to disengage the armature 306 and move the slide valve to the air release position. The spring bears against an end of the chest and a collar on the valve stem. The structure of the chest 84 is the same as that of the chest 83, as indicated by corresponding numerals in Figures 4, 5 and 6, the armature of the former chest being designated 311 for the purpose of distinction.

Figures 20 to 25 illustrate the mountings for the track electro-magnets and show how the rails are bonded. Clamps composed of complemental wooden or other jaws 312 and 313, hold the diminishing magnets 9 and stop magnets 10 in position. The jaws are secured together by bolts 314 or the like. A bracket 315, suitably attached to the clamp jaws next to a rail, includes a tubular extension 316 with an insulating sleeve 317 through which the bond wires 6 and 7 pass. The ends of the bond wires are connected with the ends of abutting rails as shown in Figure 23. Some of the brackets have longer necks than others so that certain magnets may be disposed further from the rails than others as pictured in Figure 21.

*The electrical relay mechanism* performs important functions in the foregoing operations, mainly in the control of the valves 68, 69, 70 and 71. Attention is directed to Figs. 2 and 3, but more particularly to Figs. 4, 5 and 6. A generator 201, or other source of current upon the train, supplies current for the operation of the relay mechanism. The common wire 202 is regarded as being positive. The common wire 203 is regarded as being negative. Connections from the former join the primary and secondary armatures 204 and 205 of the diminishing mechanism and primary and secondary armatures 206 and 207 of the stop mechanism with one side of the generator.

The primary armature 204 remains in engagement with a contact 209 so long as the primary magnet 210 remains energized to attract it. Energization occurs by an electrical current produced in a local wiring 211 by the passage of a pick-up magnet 212 through the magnetic field of the energized diminishing magnets 9. An amplifier 213 of any known and approved construction and embraced by the wiring 211 amplifies the current.

Current for the energization of a secondary magnet flows from the generator 201 over wire 202 to the amature 204 which engages the contact 209. A wire 215 and the common wire 203 complete the electrical circuit, both being connected with the magnet 214. Energization of the latter attracts the second armature 205 at which time it disengages a lower contact 216 and engages an upper contact 217. The primary magnet 210 is quick-acting because it has relatively few turns of wire. The secondary magnet 214 is slow-acting because it has relatively many turns of wire.

A wire 218 connects the lower contact 216 with an armature 219. A wire 220 connects the upper contact 217 with one side of a double electro-magnet 221 of the pressure chest 84. The other side of the electro-magnet is connected with the common wire 203.

A construction similar to that just described prevails in the stop mechanism. A train-carried pick-up magnet 222 is adapted to pass over the stop magnets 10 these, when energized, setting up a flow of current in the local wiring 223 embracing the pick-up magnet, a primary magnet 224, and an amplifier 225 of suitable design. Energization of the primary stop magnet 224 attracts the armature 206 into engagement with a contact 226.

A wire 227 connects the latter contact with one side of a secondary stop magnet 228, the other side of the magnet being connected with the common wire 203. Energization of the latter magnet attracts the armature 207 into engagement with an upper contact 229 from engagement with a lower contact 230. The latter has a wire connection 231 with the double electro-magnet 232 that is capable of attracting the armature 219.

The upper contact 229 has a connection at 233 with a wire 234 that is joined in common with an armature 235 and the double electro-magnet 236 of the slide chest 83. The primary magnet 224 has relatively few turns of wire and is quick-acting, while the secondary magnet 228 has relatively many turns of wire and is slow-acting.

At this point it is deemed proper to state the purpose of the slow-acting characteristic of the electro-magnets 214 and 228. Since the diminishing track magnets 9 are 1320 feet apart and it is desirable to hold the armature 205 (Fig. 4) against contact 217 at any speed above medium speed, for example 15 miles per hour, it becomes necessary to establish in the magnet 214 the quality of retentiveness so that the armature 205 will not fall in the interval between magnet 9. The magnet 228 functions similarly but in this instance it is necessary to retain the armature 207 against contact 229 while traversing stop magnets 10 which are 891 feet apart at any speed above low-speed or 10 miles per hour.

In conformity with certain requirements of the Bureau of Safety of the Interstate Commerce Commission it is absolutely necessary to have the caution and stop track magnets 9 and 10 differentially spaced along the track as well as to have the magnets 214 and 228 slow-acting. If the slow-acting characteristics of these magnets were identical the train control would be secured at only one or the other of the speeds referred to above and could not be adjusted to operate at one of said speeds. Since it is true that low-speed restrictions and medium-speed restrictions are different and that the Bureau of Safety requires automatic operation, when needed, at each of said speeds there is the positive necessity for differential spacing of the caution and danger trackside magnets. The energization of the caution trackside magnets 9 is not independent of the energization of the danger magnets 10 because these are joined in series as well shown in Fig. 1. Hence it will be evident that the caution magnets 9 will become energized or deenergized at the same time that the danger magnets 10 in the block preceding or ahead are energized or deenergized.

The armatures 219 and 235 and the electro-magnet 232 are part of a cab signal system. Although these parts are shown immediately connected with the diminishing and stop mechanisms they are to be regarded as located within the engine cab, as are also the following parts. Lamps 237, 238 and 239 are lighted to indicate "danger", "caution" and "safe track conditions". Consequently these lamps are red, yellow and green respectively.

Associated with the respective lamps are electro-magnets 240, 241 and 242. The various electro-magnets have armatures 243, 244 and 245. A continuation 246 of the wire 231 connects with the magnet 240, a current return to the common wire 203 being provided by a wire 247, which, incidently, is also common to the magnets 241 and 242. A bell or other audible signal 248 is connected at one terminal with the wire 246, a wire 249 connecting the other terminal with the common return wire 203. A switch 250 permits cutting out the audible signal.

The positive wire 202 has common connection with each of the armatures 243, 244 and 245. The latter carry flags, or other visual indicators, describing the nature of the respective signals. For instance, the armature 243 carries a flag with the legend "Red". Armature 243 has a complementary contact 251 joined with one side of the lamp 237 by means of a wire 252. The other side of the lamp is connected to the common wire 203.

Complementary contacts 253 of the armature 244 are engageable to complete a circuit through the lamp 238 over a wire 254 and a connection with the negative wire 203. Similarly, complementary contacts 255 of the armature 245 are engageable to complete a circuit through the lamp 238 over a wire 256 and a connection with the common negative wire 203.

One terminal of a double electro-magnet 257 is connected with a back contact 258 of the armature 219 by means of a wire 259. The other terminal is connected with the electro-magnet 241 by a wire 260. The back contact 261 of the armature 235 is connected with one terminal of the electro-magnet 242 by means of a wire 262.

*A summary of the operation* follows. The statements of the various conditions and operations are given in a concise manner in order that any particular item of information may be acquired at once, and without consulting any suitable volume of descriptive matter which ordinarily might be justified.

Assume that the main air brake line 93 carries an air pressure of 70 pounds. The vent valve 183 (Fig. 7) is adjusted to open at 65 lbs. pressure, in other words, upon a reduction of 5 lbs. from the foregoing brake line pressure. The vent valve 185 (Fig. 7) is adjusted to open upon a 20 lb. pressure reduction, in other words, at 50 lbs. pressure. The cocks 186 and 187 are furnished so that air under pressure may be admitted to the respective vent valves when the occasion arises.

*Running in a safe block*

Refer to Figure 1. The train T is supposed to be traveling over the rails in the direction of block A, it being regarded as occupying block B at present. Block A is safe and remains so until the flow of current from the local battery 8 of that block is interrupted.

Current from said battery flows over wire 11 to the rail 2 over wire 13 through relay 15, returning by way of wire 14, rail 3 and wire 12 to the battery. Relay 15 attracts armature 16 and current flows from generator 18 over wire 19, armature 16, stop magnets 10 of block B, and diminishing magnets 9 of the block C returning to the generator by way of wire 20. Assume the block ahead of block A (only partially shown) to be safe. The resultingly energized relay 15 insures the passage of current from generator 18 to wire 21 and the stop magnets of block A connected thereby, through diminishing magnets 9 of block B returning to the generator by way of wire 20.

The thing to observe is that the diminishing magnets 9 and stop magnets 10 of block B are energized. This is due to the safe condition of block A. The condition in Figure 4 now obtains upon the train. Pick-up magnets 212 and 222 pass through the magnetic fields of the diminishing and stop magnets 9 and 10, the resulting cutting of the lines of force setting up a flow of current in the wiring 211 and 223. The amplifiers 213 and 225 boost the current. Primary magnets 210 and 224 are intermittently energized and attract armatures 204 and 206.

The completion of circuits from generator 201 over the wires 202, 215, 227 and 203, resulting from the engagement of contacts 209 and 226 energizes the secondary magnets 214 and 228 so that armatures 205 and 207 are attracted. Magnet 221 attracts armature 311 by virtue of a flow of current from generator 201, wire 202, armature 205, wire 220 and wire 203. Magnet 236 attracts armature 306 by a flow of current from generator 201, armature 207, wires 233, 234 and 203. Magnet 242 attracts armature 245 by a flow of current from generator 201, armature 207, wires 233, and 234, armature 235, and wires 262 and 203. The green lamp 239 is lighted by a flow of current from armature 245, wire 202, contact 255, and wires 256 and 203.

Attraction of armatures 306 and 311 holds the slide valves 81 and 82 up. Air from the main reservoir 104 (Fig. 2) passes through pipe 106 and the small branch thereof to the pressure chests 83 and 84, into branch 85 and pipes 79 and 80 leading to the cylinders 76 of valves 69, 71 and 68, 70. Each of the latter is held closed (Figs. 2 and 4).

Refer to Figure 2. The train is regarded as running at a permissible speed between 15 and 60 miles per hour. The volume of air delivered by the compressor 31 is sufficient in pressure to hold valves 44, 45, 46, 47, 48 and 49 open. The auxiliary reservoir 52 is being charged, but some of the air is escaping to the stack by way of pipe 129 because the pressure of air in the auxiliary reservoir is not sufficient to force the valve 57 up against the tension of spring 158. The main steam valve 97 is open.

*Running into a caution block*

The presence of a train in block B presents a condition of danger for a train in block C. In order that utmost protection may be afforded it is desired to cause a train to proceed cautiously in block D. The "caution" position is therefore described first.

Short circuiting of the local battery 8 of block B by train T de-energizes relay 15 at the beginning of block B, releases armature 16 and denies current to the stop magnets 10 of block C and diminishing magnets 9 of block D. The train carried pick-up magnet 212 (Fig. 5), passing over the de-energized diminishing magnets 9, will receive no current impulse. The primary magnet 210 is thus de-energized and the armature 204 drops. Disengagement of the contact 209 breaks the circuit through the secondary magnet 214 so that armature 205 drops.

Disengagement of the contact 217 by armature 205 breaks the circuit through magnet 221 so that the armature 311 of the pressure chest 84 drops. Air from the pipe 80 and cylinder 76 of the valves 68 and 70 exhausts to atmosphere through port 86. Engagement of the armature 205 with lower contact 216 completes a circuit from generator 201, wire 202, armature 205, wire 218, armature 219, wire 259, magnets 257 and 241, and wire 203 back to the generator.

Energization of magnet 257 attracts armature 235 and breaks the circuit of magnet 242, thus extinguishing the caution light (Figs. 5 and 6). Armature 245 drops, and lamp 239 is extinguished. Energization of magnet 241 attracts armature 244 and closes the circuit through the yellow lamp 238 causing that lamp to be lighted.

Valve 68, now being open, permits the flow of air from reservoir 104 and pipe 106 to pipe 108 and into the chamber 198 beneath the piston 199 (Figs. 9 and 18). The raising of the piston forces the stop 196 into the path of the abutment 195 (Fig. 15). Uncovering of the entrance to pipe 111 permits air to flow into said pipe through check valve 200 and into the left end of the valve cylinder 103. The piston 102 is driven to the right until the abutment 195 engages the stop 196. The action of the piston 101 turns the lever 99 and partly closes the main steam valve 97. The train speed is thus diminished.

The valve 70 being open also permits the passage of air from the main air brake line 93 to the vent valve 183 (Fig. 7) the air escaping until a 5 lb. pressure reduction occurs in the air line. A partial application of the brakes will result in the foregoing diminution of the train speed. The piston 102 is returned to the left end of the cylinder 103 by compressed air admitted from the reservoir 104 upon opening the valve 116 (Fig. 2). A release of air from the left end of cylinder 103 may occur by properly adjusting the valve 128. The spring 114 will return the main steam valve 97 to the original open position.

*Running into a danger block*

The block C is such a block. It was pointed out in the description of block D that the stop magnets 10 of block C became de-energized by the disengagement of armature 16 from contact 17 upon de-energization of relay 15 by the short circuiting of the local battery 8 of the block B. The fact of de-energization of the stop magnets 10 causes the condition of the train-carried mechanism shown in Fig. 6. Deprivation of current to the primary magnet 224 by virtue of the absence of a magnetic field for the energization of the pick-up magnet 222 causes armature 206 to drop.

This breaks the circuit through secondary magnet 228 and permits armature 207 to fall into engagement with contact 230. Disengagement of the contact 229 breaks the circuit through electro-magnet 236 so that armature 306 drops and slide valve 81 shifts downwardly and the pipes 85 and 79 are placed in communication with the atmosphere. Valves 69 and 71 are thus permitted to open. Valve 49, being a so-called vacuum valve, opens quickly but closes slowly thus making sure of a complete application of the brakes when a danger signal is given but not heeded in time. The diminishing magnets 9 of block C remain energized, and the diminishing mechanism is therefore not affected. Valves 68 and 70 therefore remain closed.

Engagement of armature 207 with contact 230 completes the circuit from generator 201, wiring 202, 231, magnet 232 and wire 246, magnet 240 and wires 247, 203 to the generator. The attraction of armature 219 breaks the circuit of magnets 257 and 241 in Figure 5. The yellow lamp 238 is extinguished. Armature 243 is attracted, and the flag bearing the legend "Red" comes into view. The red lamp 237 is lighted, indicating danger.

A previous closure of switch 250 will cause a diversion of current from wire 246 through bell 248 so that the lamp is supplemented by an audible signal.

Refer to Figure 3. Valve 69 having been opened and valve 47 remaining open by virtue of compressed air pressure, permits a flow of air from the reservoir 104 and pipes 106 and 109 through branch 193 (Figs. 9, 15, and 18) into lower chamber 190 and out of the continuation 111 of pipe 109, whence air passes through check valve 208 and pipe 111 into the left end of the valve cylinder 103. The presence of compressed air in the lower chamber 190 above the piston 191 holds the latter and the stop 196 down.

The piston 102 is thus caused to make a full stroke to the right of the cylinder 103. The lever 99 (Fig. 16) is shifted to completely close the steam valve 97. The train thus tends to stop. Stopping is enforced by the application of the brakes. Valve 71 having been permitted to open, permits a 20 lb. reduction of the brake line air pressure and the foregoing application of the brakes. Air flows from the brake line 93 past valve 71 as well as valve 49 which is still sustained in the open position, branch 120 and vent valve 185.

*Action upon an undesired increase in train speed*

A rapid rise in air pressure follows an increase in train speed by virtue of the increased action of the compressor piston 30. Under ordinary circumstances, such increases in air pressure are compensated for by the releasing valve mechanism in Figure 13. The safety valve 163 will operate as a last resort to prevent bursting of the reservoir 52. But before the valve 163 may come into action the increasing air pressure in reservoir 52 will cause a simultaneous opening of valves 54 and 55 (Fig. 2). In further explanation of the operation of these valves, valve 54 opens when the maximum-speed limit is exceeded at any point and as described, causes a partial closing of the steam valve 97. At the same time that valve 54 opens, valve 55 also opens to make a service application of the brakes by allowing brake-pipe pressure to escape to atmosphere through whichever of the associated vent valves said pressure may be admitted to by the interposed 3-way cock. This cock will be adjusted according to the brake pipe pressure being carried, on the same order as cocks 186, 187 (Fig. 3).

Air from the main reservoir 104 will pass through pipes 105 and 110 to the stop chamber 198 causing the projection of stop 196 into the path of the abutment 195. Air continuing into pipe 111 and through check valve 200 will enter cylinder 103 and drive piston 102 to the right until the abutment 195 engages the stop. The same action of the piston closes the main steam valve 97 part way thus diminishing the train speed.

The open valve 55 permits the escape of air from the train pipe 93 so that a partial pressure reduction results. It is to be observed that the valve 55 has associated vent valves. These may be regarded as identical with the valves 184 and 185 (Fig. 7).

Reference is made to Figure 14. The compressor piston 30 will remain operative so long as it is coupled with the rocker 29, the coupling including the stem 37 and lock 39. It is only by the possessor of a suitable key that the lock 39 can be opened and the link 33 disconnected from the rocker. Having released the stem 37, the pin 36 can be unscrewed or otherwise removed so that the compressor piston 30 may be rendered inoperative. This provision may come into use under various conditions, as for example, during an incomplete installation of the train control.

While the construction and arrangement of the train control is that of a generally preferred form, obviously modifications and changes may be made without departing from the spirit of the invention or the scope of the claims.

I claim:—

1. In a train control, a track having rails insulated at points to divide the track into blocks, a battery in each block being connected with the rails near one end of the block, a relay magnet in each block being connected with the rails near the opposite end of the block, sets of electro-magnets disposed along the track, a source of current to energize the electro-magnets, and armatures connected with one side of said source being subject to attraction by the respective relay magnets to convey current from said source to a set of electro-magnets of one block and another set of electro-magnets of a posterior block, the latter set of electro-magnets having a common current return to said source.

2. A train control comprising track electro-magnets, means to energize said electro-magnets thus producing a succession of magnetic fields, a train-carried air brake line, a valve by which an escape of air from said line is controlled, a cylinder having a piston to operate the valve, a source of pressure fluid so sustaining the piston as to hold the valve closed, a chest having a slide valve controlling the application of the fluid, and electro-magnetic means subject to repeated energization by passage through said fields, having associated electro-magnetic means for supporting the slide valve for the foregoing function.

3. A train control comprising a train-carried air brake line, a valve for controlling the escape of air from said line, a cylinder having a piston for opening and closing the valve, a pressure chest having a slide valve controlling the application of pressure fluid to the piston, electro-magnetic means associated with the slide valve, and means for energizing the former to hold the slide valve in position for the flow of fluid to the cylinder to hold the valve closed.

4. A train control comprising a train-carried air brake line, a valve to control the escape of air from the line, a piston carrying the valve being operable in a cylinder, a pressure chest having a slide valve controlling the flow of pressure fluid to the cylinder, a stem carrying the slide valve and having an armature, an electro-magnet for attracting the armature, a train-carried circuit embracing the electro-magnet and including a source of current, track electro-magnets, means to energize the said electro-magnets to produce a succession of magnetic fields, and train-carried means influenced by passing through said fields to cause a closure of the circuit and prevent opening of said valve.

5. In a train control, a train-carried steam pipe having a steam valve, a lever to move the valve, a valve cylinder having a piston, a piston rod confronting the lever and having an abutment, a stop cylinder which comprises separate casings, connected pistons situated in the respective casings, one of the pistons carrying a stop, a source of pressure fluid having a connection with the valve cylinder, said connection having branches leading to the respective casings, means to direct the flow of pressure fluid to the valve cylinder through one of the casings to displace both stop pistons and to project the stop into the path of the abutment for limiting the movement of the valve piston, and means for directing pressure fluid into the valve cylinder through the other casing, holding the other stop piston depressed to prevent projection of the stop and permit a full stroke of the valve piston.

6. A train control comprising a train-carried steam pipe having a steam valve, movable means by which the valve may be shifted toward a closing position, a source of pressure fluid for moving said means, a pair of valves, means acting under the pressure of fluid from said source to keep one of the valves closed, a compressor having a connection with the other valve, means utilizing the movement of the train to operate the compressor and thus keep the other valve open, track electro-magnets, means to energize them to produce magnetic fields, and train-carried means responsive to a failure of said fields to cause the said means acting under pressure to cut off the pressure and permit the closed valve to open for an application of the pressure fluid to said movable means so that the steam valve may be shifted.

7. A train control comprising a train-carried steam pipe having a steam valve, movable means to shift the steam valve toward a closed position, a source of pressure fluid, a pair of valves for controlling the flow of fluid, a pressure chest through which the pressure fluid from said source is directed to keep one of the valves closed, a slide valve in said chest having an energized electro-magnetic actuator, a train-operated compressor for keeping the other valve open, track electro-magnets, means to energize them and produce a succession of magnetic fields, and train-carried means responsive to a failure of said fields to cause de-energization of said electro-magnetic actuator and a closing of the slide valve, thus cutting off the pressure fluid from the first valve, permitting pressure fluid from said source to flow through both valves for operation of said movable means.

8. A train-control comprising a train-carried steam pipe having a steam valve, movable means to shift the valve toward a closed position, means capable of acting to induce movement of said means, means which will produce a volume of fluid by a train travelling within determined speed limits, and means to suspend the action of said foregoing means and so prevent movement of the movable means.

9. A train control comprising a train-carried air brake line having an air valve set to open at a determined pressure, a steam pipe having a valve, movable means to perform closing movements of the steam valve, a source from which power is derived to actuate said means, an air valve associated with said source of power being set to open at a determined pressure, a compressor, means that is actuated when the train is in motion to operate the compressor, and a reservoir in which fluid from the compressor is stored until the determined pressures are reached, causing an opening of both air valves with a simultaneous release of brake line pressure and an application of power to said movable means for a closing movement of the steam valve.

10. A train control comprising a train-carried air brake line having two valves, means assuming one of two positions to which it is subject to maintain one of the valves in the closed position, a track component assuming a condition in which said one position of the foregoing means is maintained, and a compressor depending on the movement of the train for its operation to keep the other valve open, termination of the out put of the compressor upon a stopping of the train permitting said other valve to close thus to avoid a loss of brake line pressure following a possible opening of the first valve upon a variation in the condition in said track component.

11. A train control comprising a train-carried air brake line having two valves, means assuming one of two positions to which it is subject to maintain one of the valves in the closed position, an electrical track component having associated means for its energization to produce a magnetic field along the track, train-carried means subject to said magnetic field to maintain the foregoing means in said one position, and a compressor operating when the train is in motion to supply air for the maintenance of the second valve in an open position, but permitting the closing of that valve upon cessation of the air pressure when the train stops to avoid the loss of brake line pressure with the opening of the first valve upon a possible failure of the magnetic field.

12. A train control comprising two series of track electro-magnets, the magnets in one series being relatively close together and the magnets in the other series being relatively far apart, means to energize both series producing two lanes in which the magnetic fields are variously spaced, train-carried instrumentalities for governing the steam and air throttling functions of the train mechanism, and independent train-carried means regulated to respond to the respective frequent and more delayed impulses of the respective magnetic lanes to maintain said instrumentalities in a normal operating condition.

13. A train control comprising a train-carried pressure line, two valves in said line for controlling the flow of fluid for different purposes, a compressor that is actuated when the train is in motion, a primary air line and an air pipe extending from the compressor to the respective valves, an opening valve in the air pipe opening after the fluid delivered by the compressor into the primary air line reaches a pressure to open one of the two valves, to admit pressure fluid to the air pipe to open the other of the two valves, a reservoir, and a second opening valve in said air pipe opening to store surplus pressure fluid.

14. A train control comprising a train-carried pressure line, a valve in said line including a cylinder and a piston, a spring bearing on the piston tending to keep the valve closed, a train-operated compressor having an air pipe discharging in the cylinder to raise the piston and open the valve when the fluid pressure reaches a determined point, and a vacuum valve at which air is discharged from the cylinder and head of the piston to permit opening the valve promptly and causing the valve to seat slowly under pressure of the spring when compressed air pressure is relieved.

15. In a train control, a track divided into blocks, variously grouped track electro-magnets distributed in plural sets along each block, a circuit by which sets of dissimilar groups in adjacent blocks are connected, a source of current for the circuit, and means in one block controlling the flow of current from said source into the circuit.

16. In a train control, a track divided into blocks, sets of dissimilarly spaced groups of track electro-magnets in each of the blocks, a circuit by which the components of one set in one block are connected with the dissimilarly spaced components of the other set in an adjacent block, a source of current, and means in one block controlling the flow of current from said source into the circuit.

17. A train control comprising rows of differently spaced electro-magnets disposed along succeeding blocks of a track, means to energize companion sets of differently spaced magnets in adjoining blocks to produce differently spaced electro-magnetic fields in each block, a train-carried air brake line, valve means by which an escape of air from said line is controlled, and separate means individually subject to said fields but cumulatively and continuously responsible for preventing the opening of the valve means.

Signed at Pittsburgh, in the county of Allegheny and State of Pennsylvania, this 18th day of June, A. D. one thousand nine hundred and twenty-eight.

FRANK T. KNIGHT.